United States Patent
Endo

(10) Patent No.: US 8,166,757 B2
(45) Date of Patent: May 1, 2012

(54) ENGINE WITH INTERNAL EGR SYSTEM

(75) Inventor: Hiroyuki Endo, Nagasaki-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 303 days.

(21) Appl. No.: 11/976,536

(22) Filed: Oct. 25, 2007

(65) Prior Publication Data

US 2008/0148729 A1    Jun. 26, 2008

(30) Foreign Application Priority Data

Dec. 25, 2006   (JP) .................... 2006-348687

(51) Int. Cl.
*F02B 33/44* (2006.01)
*F02B 47/08* (2006.01)
*F02D 23/00* (2006.01)
*F02M 25/07* (2006.01)

(52) U.S. Cl. .............. 60/605.2; 60/602; 123/568.13; 123/568.14

(58) Field of Classification Search .......... 60/605.2, 60/602, 39.5; 123/568.13–4, 568.14
See application file for complete search history.

(56) References Cited

U.S. PATENT DOCUMENTS

| | | | |
|---|---|---|---|
| 5,771,868 A | 6/1998 | Khair | |
| 6,170,474 B1 * | 1/2001 | Israel | 123/568.14 |
| 6,637,205 B1 | 10/2003 | Ahmad et al. | |
| 6,772,742 B2 * | 8/2004 | Lei et al. | 123/568.14 |
| 6,840,235 B2 * | 1/2005 | Koseki et al. | 123/568.14 |
| 6,904,356 B2 * | 6/2005 | Uchida et al. | 701/108 |
| 7,021,298 B2 * | 4/2006 | Nakazawa et al. | 123/568.14 |
| 7,162,996 B2 * | 1/2007 | Yang | 123/321 |
| 7,201,121 B2 * | 4/2007 | Weber et al. | 123/90.12 |
| 7,281,531 B1 * | 10/2007 | Fulton et al. | 123/568.17 |
| 7,284,533 B1 * | 10/2007 | Huang et al. | 123/321 |
| 7,367,318 B2 * | 5/2008 | Moriya et al. | 123/435 |
| 7,409,943 B2 * | 8/2008 | Benz et al. | 123/321 |
| 2005/0109028 A1 | 5/2005 | Shirakawa et al. | |
| 2005/0229901 A1 * | 10/2005 | Weber et al. | 123/316 |

FOREIGN PATENT DOCUMENTS

| | | |
|---|---|---|
| CN | 1273624 | 11/2000 |
| JP | 07-133726 | 5/1995 |
| JP | 2003-3903 | 1/2003 |
| JP | 2003-97252 | 4/2003 |
| JP | 2005-048743 | 2/2005 |
| JP | 2005-534852 | 11/2005 |

OTHER PUBLICATIONS

Chinese Office Action dated Apr. 24, 2009 in Chinese Application No. 200710167976.8 with translation.

* cited by examiner

*Primary Examiner* — Mary A Davis
(74) *Attorney, Agent, or Firm* — Wenderoth, Lind & Ponack, LLP

(57) ABSTRACT

An engine with EGR system equipped with a variable geometry turbocharger and a particulate filter is provided in which the nozzle angle (nozzle area) of the variable geometry turbocharger can be controlled accurately and by a simple means in accordance with the change in the internal EGR rate due to deposition of particulate matter in the particulate filter, and the effect of EGR to reduce NOx emission is obtained in the whole operation range of the engine without deteriorating durability of the engine.

3 Claims, 7 Drawing Sheets

ENGINE WITH INTERNAL EGR SYSTEM

BACKGROUND OF THE INVENTION

1. Field of the Invention

The present invention relates primarily to 4-stroke cycle diesel engines, particularly, engines equipped with a DPF (diesel particulate filter), variable geometry turbocharger, and internal EGR (Exhaust Gas Recirculation) system which is composed such that a fraction of the exhaust gas joins together with the charged air in the cylinder of the engine by allowing the exhaust valve to lift a little in the suction stroke.

2. Description of the Related Art

There are 4-stroke cycle diesel engines and 4-stroke cycle gasoline engines that adopt an internal EGR system in which a fraction of the exhaust gas joins together with the charged air in the cylinders of the engine by allowing the exhaust valve to lift by a small lift in the suction stroke. This is called exhaust valve sub-lift type internal EGR system.

The exhaust valve sub-lift type internal EGR system will be explained with reference to FIG. 6. In FIG. 6, valve lift curve of the exhaust valve 7 and that of the inlet valve 5 versus crank angle are indicated by Es and In respectively. The exhaust valve lift Ex in the exhaust stroke is called here as the main exhaust valve lift. The exhaust valve 7 is lifted again by a small lift Hs in the suction stroke as shown by sub-lift Es of the exhaust valve 7. By lifting the exhaust valve by a small lift Hs in the suction stroke, a fraction of the exhaust gas in the exhaust passage flows back into the cylinder. Thus, internal EGR is performed and generation Nox is reduced.

There are disclosed several types of EGR system of internal combustion engine. For example, in Japanese Laid-Open Patent Application No. 7-133726 (patent literature 1) is disclosed an inlet air control system of an internal combustion engine. According to the system, an inlet control valve is provided in the inlet air passage. Negative pressure is formed in the inlet air passage by closing the inlet control valve and inlet valve in this order just before the end of suction stroke. When the inlet valve is opened before the inlet control valve is opened just before the end of exhaust stroke, combustion gas in the cylinder flows into the inlet passage retained in negative pressure aided by the upward movement of the piston. The combustion gas flowed into the inlet passage flows into the cylinder together inlet air in the suction stroke as EGR gas. In this way internal EGR is performed. By controlling negative pressure in the inlet passage by in accordance with engine operating conditions such as engine load and rotation speed through controlling the inlet control valve or other means, the rate of EGR gas can be controlled.

In Japanese Laid-Open Patent Application No. 2005-48743 (patent literature 2) is disclosed a control system of a turbocharged engine equipped with after-treatment devices of exhaust gas such as catalytic converters and diesel particulate filter (DPF). In this system, a means for calculating equivalent flow area of the DPF decreased due to deposition of particulate matter in the DPF and a means for controlling nozzle angle of the variable geometry turbocharger in accordance with reduction in the equivalent flow area of the DPF. When exhaust backpressure increases due to the deposition of particulate matter in the DPF, the nozzle angle is increased, i.e. area between the tips of nozzle vanes is increased so that exhaust backpressure is decreased and increase in EGR rate is suppressed.

In an engine equipped with the exhaust valve sub-lift type internal EGR system, the exhaust valve is lifted again in the inlet stroke by the small lift (Hs) as shown in FIG. 6 so that a fraction of exhaust gas in the exhaust passage flows back into the cylinder to be mixed with the charged air. When the flow resistance in the DPF located downstream of the turbocharger increases due to deposition of particulate matter, exhaust backpressure increases and inlet air flow to the engine decreases, as a result excessive exhaust gas recirculation occurs, which enhance generation of particulate matter mainly composed of carbon particles and deposition of particulate matter in the DPF is enhanced. Further, when the internal EGR rate is excessively large, combustion temperature increases and effect of reducing NOx generation by EGR is decreased by the increased combustion temperature.

Particularly, with an engine provided with a particulate filter, when deposition of particulate matter in the particulate filter increases, exhaust backpressure increases due to increased flow resistance in the particulate filter. The increase in exhaust backpressure induces decrease in air supply which induces increase in internal EGR rate.

In the system disclosed in the patent literature 1, internal EGR amounts are controlled by controlling negative pressure in the inlet air passage between the inlet control valve and inlet valve. However, a means to deal with the problem incurred by the increase in combustion temperature due to increased EGR rate is not disclosed.

In the system disclosed in the patent literature 2, the system is applied to an engine equipped with a variable geometry turbocharger and the nozzle angle of the turbine is increased to increase nozzle area in accordance with decreased equivalent flow area in the DPF due to deposition of particulate matter. However, the system is very complicated and it is not easy to control the nozzle angle with high precision, and a means to deal with the problem incurred by the increase in combustion temperature due to increased EGR rate is not disclosed in the patent literature 2.

SUMMARY OF THE INVENTION

The present invention was made in light of the problems mentioned above, and an object of the invention is to provide an engine equipped with a variable geometry turbocharger and
a particulate filter is provided of which the nozzle angle (nozzle area) of the variable geometry turbocharger can be controlled accurately and by a simple means in accordance with the change in the internal EGR rate due to deposition of particulate matter in the particulate filter. Another object of the invention is to provide an engine with an internal EGR system with which the effect of EGR to reduce NOx emission is obtained without deteriorating durability of the engine.

The engine with an internal EGR system is provided with a DPF for removing particulate matter in the exhaust gas and a variable geometry turbocharger capable of varying exhaust flow capacity through the turbine of the turbocharger by changing nozzle angles thereof. In the engine, exhaust valve sub-lift type internal EGR method in which the exhaust valve is lifted by a small lift in the intake stroke is adopted, a means for detecting pressure difference between the exhaust gas inlet and outlet of the DPF (DPF pressure difference) is provided, and
a proper VG nozzle angle of the variable geometry turbocharger is calculated so that said DPF pressure difference becomes the DPF reference pressure difference which is commensurate with a permissible internal EGR rate (i.e. so that with the VG nozzle angle the exhaust pressure at the entrance of the turbine becomes a pressure with which the pressure difference in the DPF becomes the reference pressure difference) based on the DPF pressure difference detected by the DPF pressure difference detecting means. The engine is provided with an internal EGR controller for controlling an actuator for controlling the nozzle angle of the turbine so that it is set to the proper nozzle angle calculated.

To be more specific, in the internal EGR controller are established a relation between permissible EGR rates, that are EGR rates with which predetermined reduction in NOx emission is obtained under a permissible limit of exhaust temperature or lower, and permissible pressure differences in DPF (maximum permissible DPF pressure differences) commensurate with the permissible EGR rates, and a relation between DPF pressure differences and VG nozzle angles with which exhaust gas pressure at the entrance of the turbine becomes a pressure with which DPF pressure difference becomes said DPF pressure difference.

The internal EGR controller calculates a proper VG nozzle angle with which DPF pressure difference becomes to be a DPF reference pressure difference by comparing the detected DPF pressure difference with the DPF reference pressure differences and control the actuator to set the VG nozzle angle to the proper VG nozzle angle calculated.

Further, in the invention, a variable capacity compressor for supplying pressurized air to the engine is provided, and the internal EGR controller controls the variable capacity compressor so that air supply pressure is increased by the variable capacity compressor when the VG nozzle angle is larger than an angle set in accordance with engine operating conditions.

The variable capacity is preferably connected in series with the compressor of the variable geometry turbocharger to compose a 2-stage supercharge system with which air pressurized by the variable compressor is further compressed by the compressor of the turbocharger.

DETAILED DESCRIPTION OF THE PREFERRED EMBODIMENTS

Preferred embodiments of the present invention will now be detailed with reference to the accompanying drawings. It is intended, however, that unless particularly specified, dimensions, materials, relative positions and so forth of the constituent parts in the embodiments shall be interpreted as illustrative only not as limitative of the scope of the present invention.

Figure 1:
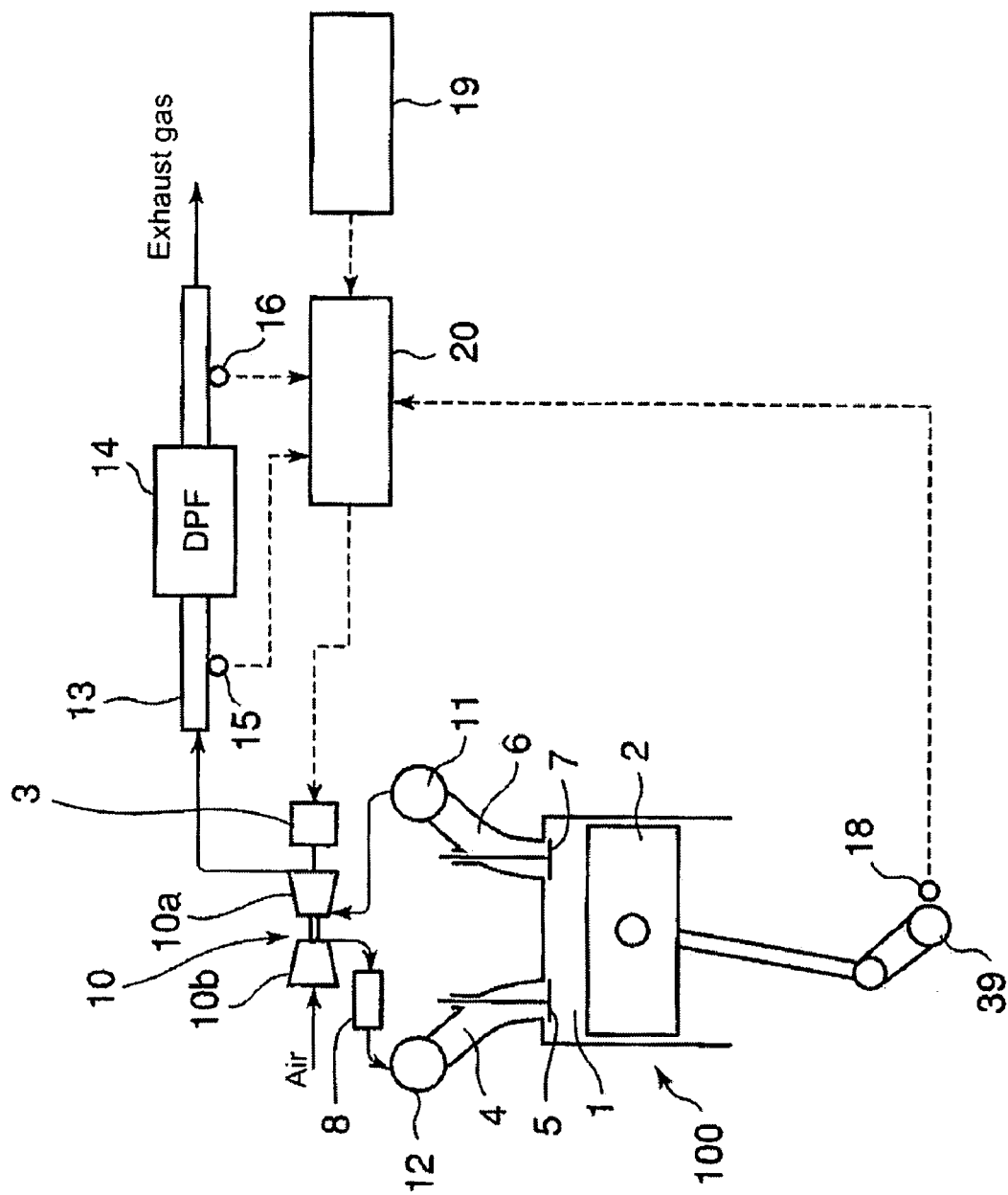
FIG. 1 is a schematic representation of overall construction of a 4-stroke cycle diesel engine equipped with an internal EGR system of the first embodiment of the present invention.

FIG. 1 is a schematic representation of overall construction of a 4-stroke cycle diesel engine equipped with an internal EGR system of the first embodiment of the present invention.

In FIG. 1, reference numeral 100 is an engine (4-stroke cycle diesel engine), 1 is a combustion chamber in the cylinder 100 of the engine, 2 is a piston, and 39 is a crankshaft. Reference numerals 4 and 6 are an inlet and exhaust passage respectively in a cylinder head of the engine. Reference numerals 5 and 7 are an inlet and exhaust valve respectively. Reference numerals 11 and 12 are an exhaust and inlet manifold respectively. Reference numeral 10 is a turbocharger composed of an exhaust turbine 10a and an air compressor 10b. Reference numeral 8 is an air cooler for cooling the pressurized air from the compressor 10b.

The turbocharger 10 is a variable geometry (VG) turbocharger equipped with a nozzle vane moving mechanism for varying nozzle angle. The turbine 10a is driven by the exhaust gas flowing out from the exhaust manifold 11 to enter the turbine 10a and the compressor 10b connected to the turbine 10a is driven by the turbine 10a to supply pressurized air to the inlet manifold 12.

Reference numeral 3 is an actuator for controlling nozzle angle by actuating the mechanism for varying nozzle angle to vary nozzle area of nozzle vanes in the turbine 10b.

Figure 7:
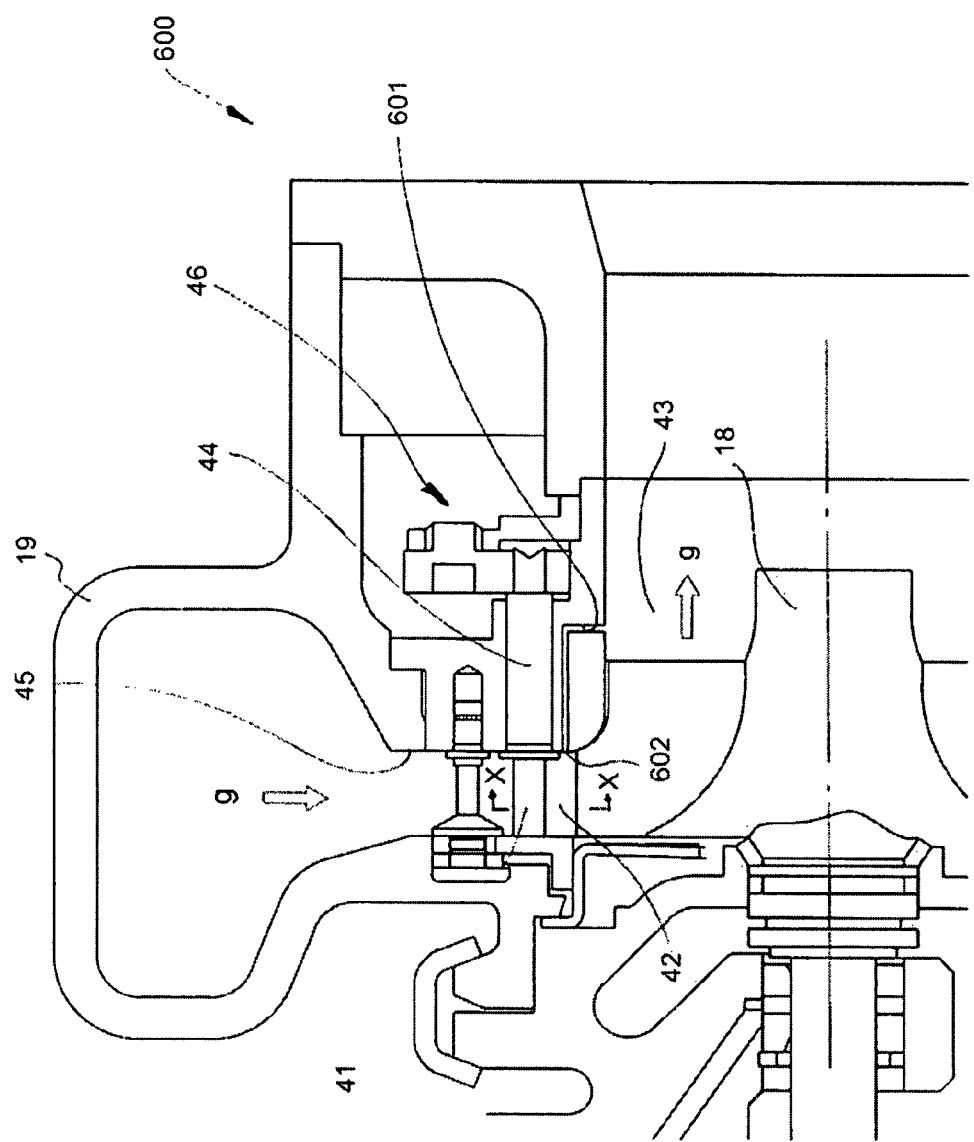
FIG. 7 is a section of a substantial part of a variable geometry (VG) turbocharger.
Figure 8:
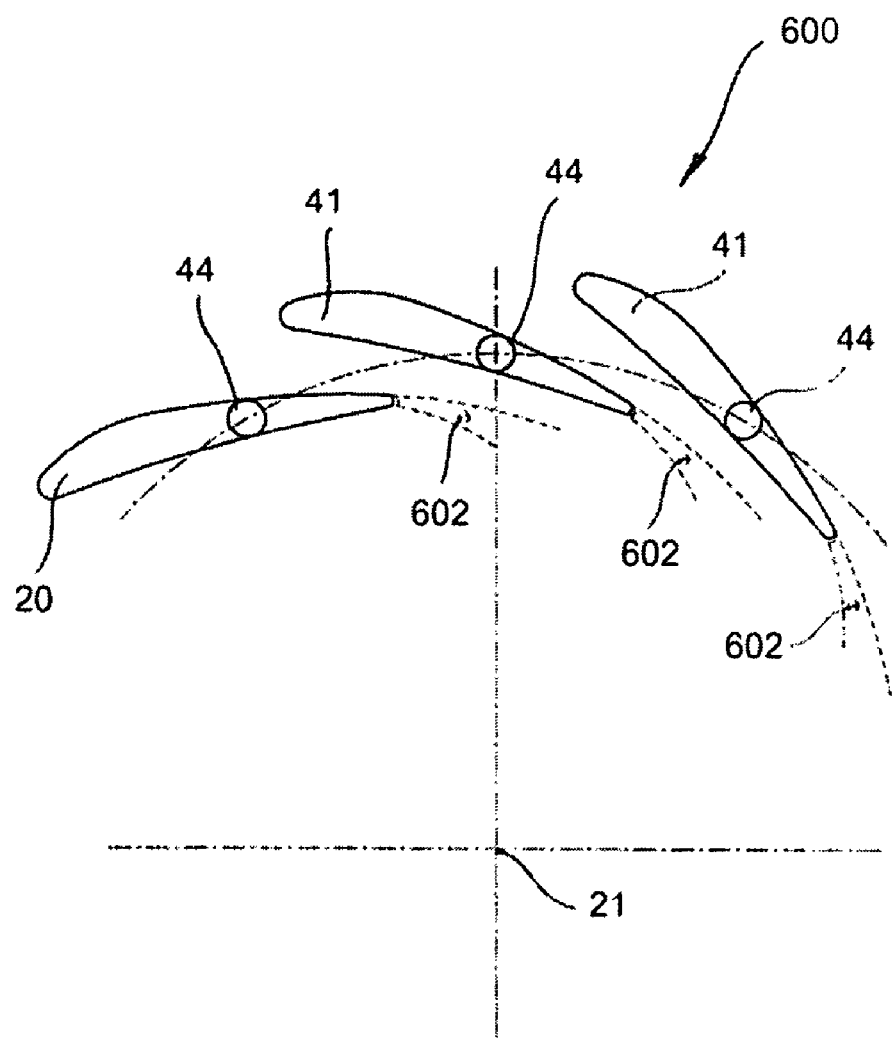
FIG. 8 is a view in the direction of arrows X-X in FIG. 7.

The variable geometry turbocharger is shown in FIGS. 7 and 8.

FIG. 7 is a section of a substantial part of a variable geometry (VG) turbocharger. In FIG. 7, reference numeral 600 is the VG exhaust turbine, 18 is a turbine wheel, 19 is a turbine casing, 41 is a nozzle vane of a plurality of nozzle vanes of which the area between the tips can be changed by actuating the nozzle vane moving mechanism. Reference numeral 42 is an annular space at the entrance of exhaust gas to the turbine wheel 18, 43 is an exhaust gas outlet, 46 is a nozzle vane moving mechanism, and 44 is a nozzle shaft of each of the nozzle vanes to connect each nozzle vane to the nozzle vane moving mechanism 46. Reference symbol g indicates exhaust gas of the engine. FIG. 8 is a view in the direction of arrows X-X in FIG. 7.

Back to FIG. 1, an exhaust pipe 13 connected to the exhaust outlet of the turbine 10a is provided with a DPF (diesel particulate filter) 14 for removing particulate matter (composed mainly of carbon particles) contained in the exhaust gas.

The air supplied by the compressor 10b of the VG turbocharger 10 is cooled in the air cooler 8 and introduced via the inlet manifold 12 to the inlet passage 4 of each cylinder to be introduced into the combustion chamber of each cylinder when the inlet valve 5 is opened.

The exhaust gas after the fuel injected into the combustion chamber 1 is burned flows out from the combustion chamber 1 and introduced to the turbine 10a via the exhaust passage 6 and exhaust manifold 11 to drive the turbocharger 10. The exhaust gas flowed out from the turbocharger 10 enters the DPF 14, where particulate matter in the exhaust gas is removed, then the exhaust gas is cleaned by means of an exhaust gas decontamination device provided with catalytic substance and exhausted into the atmosphere.

Figure 6:
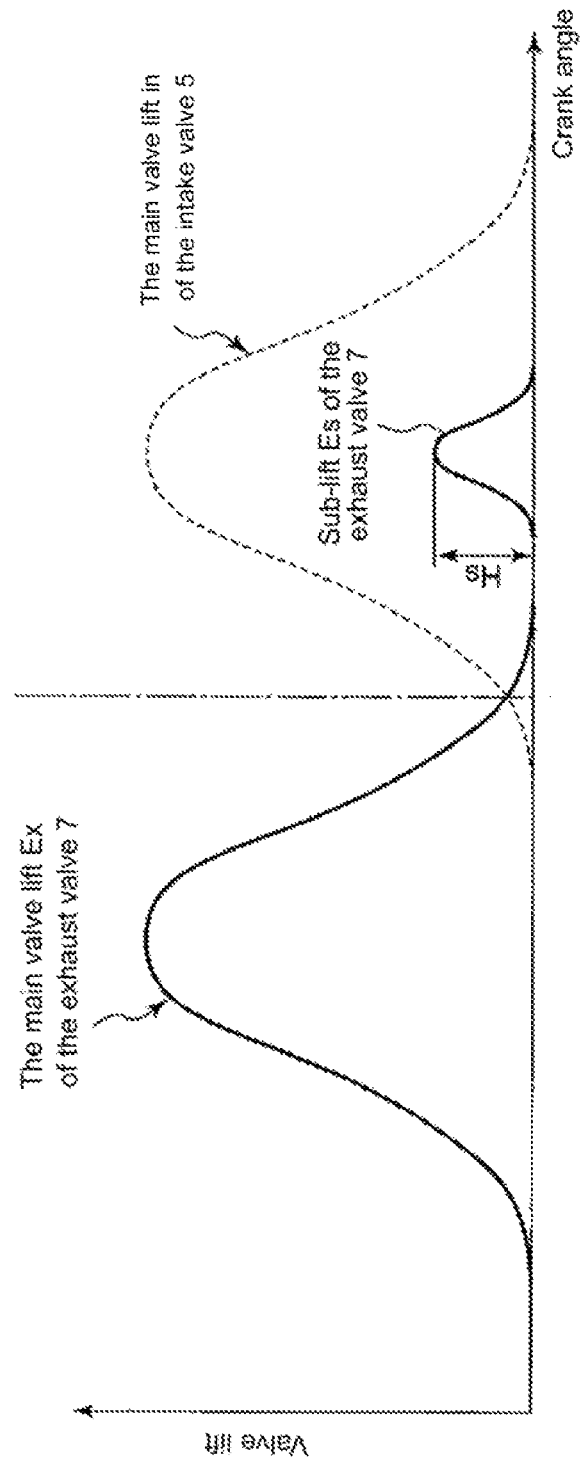
FIG. 6 is a graph showing exhaust and inlet valve lifts versus crank angle of a 4-stroke cycle engine equipped with the exhaust valve sub-lift type internal EGR system.

The inlet valve 5 and exhaust valve 7 are driven by an inlet cam and exhaust cam to open and close the inlet and exhaust passage 4 and 6 respectively by the rotation of the cams driven by the crankshaft 39. In the exhaust valve sub-lift type internal EGR system, the exhaust valve 7 is lifted by a small lift again in the intake stroke as shown in FIG. 6 to introduce a fraction of exhaust gas in the exhaust passage into the combustion chamber to allow the exhaust gas to mix with the air charged in the cylinder. This type of internal EGR method is called an exhaust valve sub-lift type EGR in this invention.

The present invention relates to an improvement in an exhaust valve sub-lift type internal EGR system in a 4-stroke cycle engine equipped with the variable geometry exhaust gas turbocharger 10 as described above.

Referring to FIG.1, an internal EGR controller is indicated by reference numeral 20. An engine load detected by a load detecting sensor 19 and an engine rotation speed detected by a rotation detecting sensor 18 are inputted into the internal EGR controller 20.

Further, a DPF inlet pressure sensor 15 and a DPF outlet pressure sensor 16 are provided at the exhaust gas inlet and outlet of the DPF 14 respectively. Pressures detected by the DPF inlet pressure sensor 15 and DPF outlet pressure sensor 16 are inputted to the controller 20.

Figure 2:
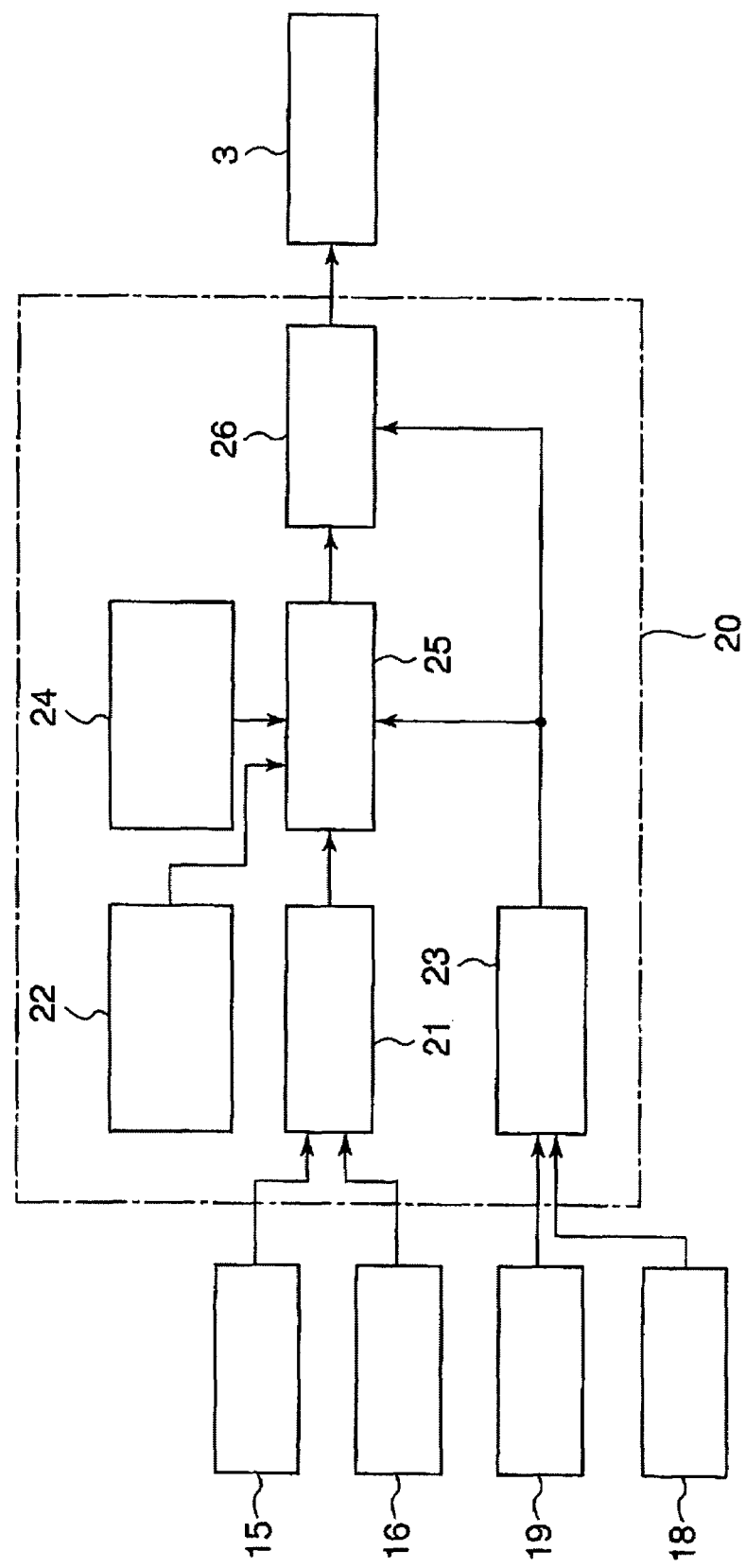
FIG. 2 is a control block diagram of the internal EGR system of the first embodiment.

Next, control operation of the internal EGR system will be explained referring to FIGS. 2-4.

Detected DPF inlet pressure P1 and DPF outlet pressure P2 detected by the inlet pressure sensor 15 and outlet pressure sensor 16 respectively are inputted to a DPF pressure difference calculation section 21 of the controller 20. The DPF calculation section calculates a pressure difference (P1-P2) between the DPF inlet pressure P1 and DPF outlet pressure P2 and outputs the calculated pressure difference value to a VG nozzle angle adjustment amount calculation section 25.

Detected engine load sent from the load detecting sensor 19 and engine rotation speed sent from the rotation speed detector 18 are inputted to a VG nozzle angle setting section 23. The VG nozzle angle setting section 23 calculates a VG nozzle angle in accordance with engine operating conditions represented by the detected engine load and rotation speed and outputs the calculated VG nozzle angle to a VG nozzle angle calculation section 26.

Figure 3:
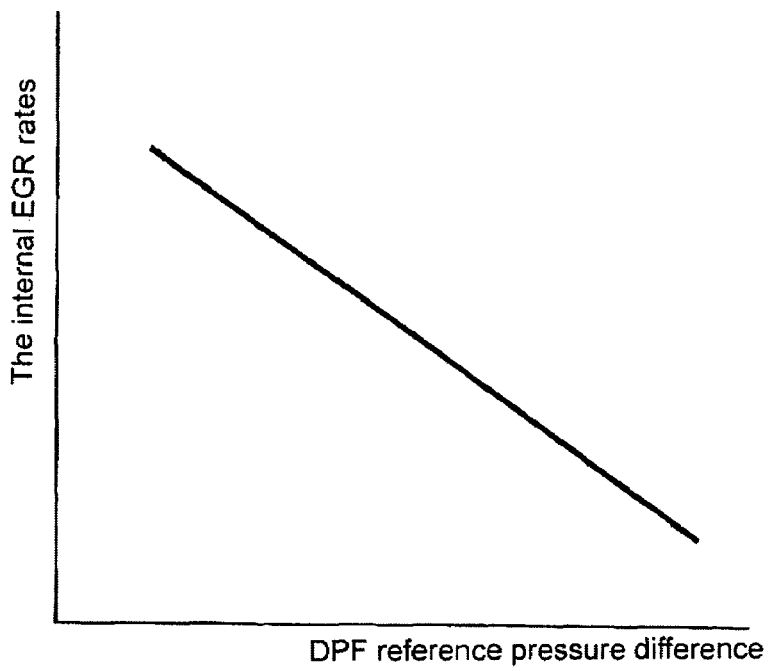
FIG. 3 is a graph showing a relation between reference pressure difference in the DPF (diesel particulate filter) and internal EGR rate.
Figure 4:
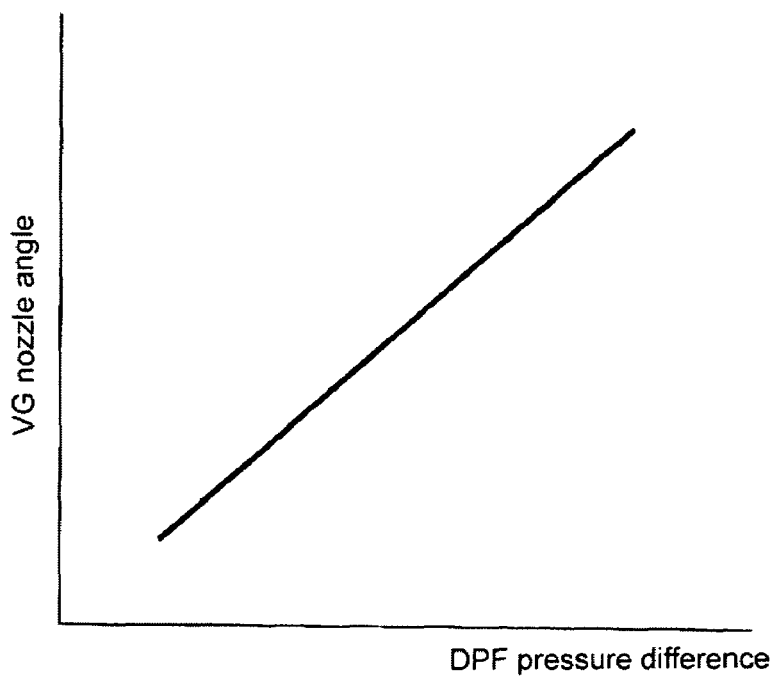
FIG. 4 is a graph showing a relation between pressure difference in the DPF and VG (variable geometry) nozzle angle.

In a DPF reference pressure difference/EGR rate setting section 22 is established a relation between permissible EGR rates, that are EGR rates with which predetermined reduction in NOx emission is obtained under a permissible limit of exhaust temperature or lower, and permissible pressure differences in DPF (maximum permissible DPF pressure differences) commensurate with the permissible EGR rates as shown in FIG. 3.

In a DPF pressure difference/VG nozzle angle setting section 24 is established a relation between DPF pressure differences and VG nozzle angles with which exhaust gas pressure at the entrance of the turbine becomes a pressure with which DPF pressure difference becomes said DPF pressure difference.

In the VG nozzle angle adjustment amount calculation section 25, the DPF pressure difference inputted from the DPF pressure difference calculation section 21 is compared with the reference pressure difference and deviation from the reference pressure difference is calculated. Further, the deviation of DPF pressure difference is cross-checked with the established relation in the DPF pressure difference/VG nozzle angle setting section 24 and VG nozzle angle to be adjusted is calculated in accordance with the deviation of DPF pressure difference, and the calculated nozzle angle to be adjusted is inputted to the VG nozzle angle calculation section 26.

The VG nozzle angle calculation section 26 corrects the VG nozzle angle calculated in the VG nozzle angle setting section 23 in accordance with engine operating conditions by the VG nozzle angle to be adjusted obtained in the VG nozzle angle adjustment amount calculation section 25 and outputs the adjusted VG nozzle angle to the actuator 3 for controlling VG nozzle angle. The actuator 3 sets VG nozzle angle to the adjusted VG nozzle angle by driving the nozzle vane moving mechanism.

According to the first embodiment as described above, the DPF pressure difference detecting means for calculating pressure difference (P1-P2) between the inlet and outlet of exhaust gas into and from the DPF 14 is provided, a proper VG nozzle angle of the variable geometry turbocharger 10 is calculated so that said DPF pressure difference becomes a DPF reference pressure difference which is commensurate with a permissible internal EGR rate (i.e. so that with the VG nozzle angle the exhaust pressure at the entrance of the turbine becomes a pressure with which the pressure difference in the DPF becomes a reference pressure difference) based on the DPF pressure difference detected by the DPF pressure difference detecting means, and the actuator 3 for controlling VG nozzle angle is controlled to rotate the nozzle vanes so that the VG nozzle angle is set to the proper VG nozzle angle. In the internal controller 20 is established permissible internal EGR rate versus DPF reference pressure difference and VG nozzle angle versus DPF pressure difference with which exhaust gas pressure at the entrance of the turbine becomes a pressure so that the DPF pressure difference is obtained, and the actuator 3 for controlling nozzle angle is controlled so that VG nozzle angle is set to the proper VG nozzle angle with which the DPF pressure difference coincides with the DPF reference pressure difference by the internal EGR controller 20. Therefore, by calculating such a proper VG nozzle angle so that the detected DPF pressure difference becomes a DPF reference pressure difference and increasing the VG nozzle angle, i.e. increasing area between the tips of the nozzle vanes in accordance with increase in DPF pressure difference in the DPF 14 due to deposition of particulate matter in the DPF 14, occurrence of excessive internal EGR can be prevented.

Therefore, according to the first embodiment, as the DPF pressure difference is detected and VG nozzle angle of the variable geometry turbocharger 10 is controlled based on the detected DPF pressure difference, the VG nozzle angle can be controlled so that the internal EGR rate of the engine is in a prescribed range with high precision as compared with the prior art.

The Second Embodiment

Figure 5:
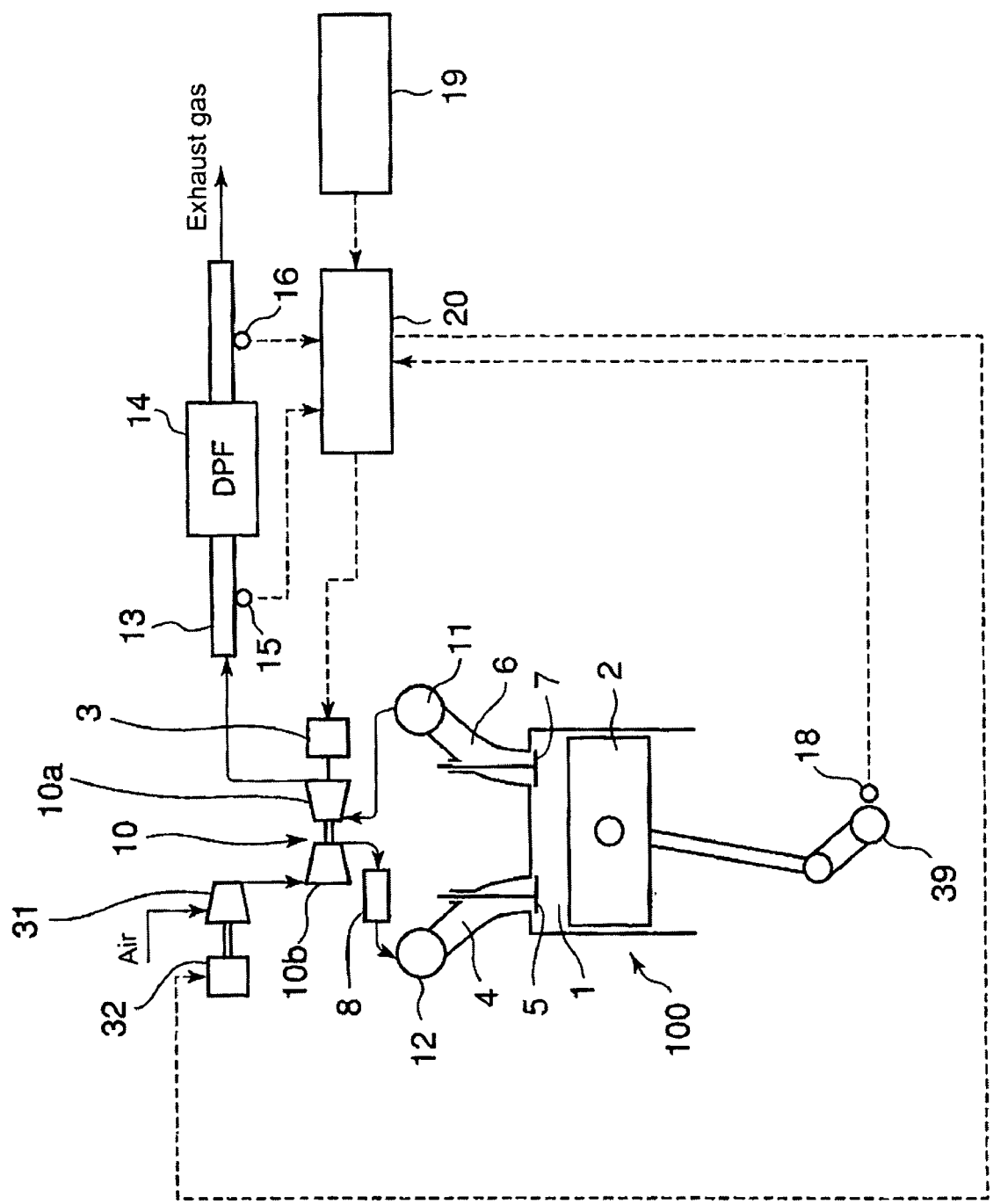
FIG. 5 is a schematic representation of overall construction of a 4-stroke cycle diesel engine equipped with an internal EGR system of the second embodiment of the present invention.

FIG. 5 is a schematic representation of overall construction of a 4-stroke cycle diesel engine equipped an internal EGR system of the second embodiment of the present invention.

In the second embodiment, a variable capacity compressor 31 driven by an electric motor 32 and capable of being varied in its discharge pressure is further added to the first embodiment shown in FIGS. 1-4 and connected in series with the compressor 10b of the variable geometry turbocharger 10. Therefore, the air charging system of the second embodiment is composed as a 2-stage supercharging system in which air pressurized by the electric motor driven compressor 31 is further pressurized by the compressor 10b of the turbocharger 10.

The internal EGR controller 20 controls the variable capacity compressor 31 to operate to increase air supply pressure when the VG nozzle angle is larger than the VG nozzle angle set in accordance with engine operating conditions including engine load detected by the load detecting sensor 19 and engine rotation speed detected by the rotation speed detector 18.

Other construction of the second embodiment is the same as that of the first embodiment, and the same constituents are denoted by the same reference numerals as those in the first embodiment.

According to the second embodiment, by providing the variable capacity and variable discharge pressure compressor 31 driven by the electric motor 32, air supply pressure can be further increased. And when the VG nozzle angle is larger than the VG nozzle angle set correspondent to engine operating conditions, air supply pressure is increased through controlling the electric motor driven compressor 31 by the internal EGR controller 20. Further, the electric motor driven compressor 31 is connected in series with the compressor 10b of the variable geometry turbocharger 10 to constitute a 2-stage supercharging system so that air pressurized by the electric motor driven compressor 31 is further compressed by the compressor 10b of the variable geometry turbocharger 10. With this composition, occurrence of excessive internal EGR caused by deposition of particulate matter in the DPF 14 can be prevented through compensating for decreased air supply pressure caused by increased VG nozzle angle, i.e. increased area between the tips of the nozzle vanes by supplying pressurized air by the electric motor driven compressor 31.

In this way, occurrence of excessive EGR can be prevented without incurring decreased air supply pressure to the engine.

The engine according to the invention comprised of a pressure difference detecting means for detecting pressure difference between exhaust gas pressure at the inlet and outlet of the DPF and an internal EGR controller for controlling an actuator for controlling VG nozzle angle so that the VG nozzle angle is controlled to be set to a proper angle in accordance with engine operating conditions by calculating the proper VG nozzle angle with which exhaust gas pressure at the entrance of the turbine is such a pressure that DPF pressure difference coincides with a DPF reference pressure difference based on the DPF pressure difference detected by the DPF pressure difference detecting means. More specifically, in the engine of the invention, permissible internal BGR rate versus DPF reference pressure difference and VG nozzle angle versus DPF pressure difference are established in the controller. Detected DPF pressure difference is compared with the DPF reference pressure difference obtained, and the actuator for controlling nozzle angle is controlled so that the nozzle angle is set to the proper nozzle angle with which the DPF pressure difference coincides with the DPF reference pressure difference. For this, the detected DPF pressure difference is compared with the DPF reference pressure difference. And only by calculating the proper VG nozzle angle with which the DPF pressure difference coincides with the PDF reference pressure difference, occurrence of excessive exhaust gas circulation can be prevented.

Therefore, according to the engine of the invention, occurrence of excessive exhaust gas circulation caused by decreased air supply to the engine due to increased exhaust backpressure which is incurred by increased pressure difference in the DPF 14 due to deposition of particulate matter in the DPF 14, can be prevented by an extremely simple means of detecting pressure difference in the particulate filter and controlling VG nozzle angle of the variable geometry turbocharger based on the detected pressure difference in the DPF.

Further, according to the engine of the invention, a variable capacity air compressor capable of being changed in discharge pressure is provided to supply pressurized air, and when the VG nozzle angle is larger than the VG nozzle angle set in accordance with engine operating conditions of the engine, the variable capacity compressor capable of being changed in discharge pressure is controlled by the internal VGR controller to increase air supply pressure to the engine.

The variable capacity compressor is preferably connected in series with the compressor of variable geometry turbocharger to supply pressurized air to the compressor of the turbocharger. By providing the variable capacity compressor, decrease of air charging pressure to the cylinder of the engine caused by increased VG nozzle angle (increased nozzle area) for the purpose of preventing occurrence of excessive exhaust gas recirculation rate can be compensated through supplying pressurized air by the variable capacity compressor to the compressor of the turbocharger.

By this, occurrence of excessive EGR can be prevented without incurring decreased air supply pressure to the engine.

As has been described heretofore, according to the engine equipped with the internal EGR system, control of the nozzle angle (nozzle area) of the variable geometry turbocharger can be performed accurately with a simple means in accordance with the degree of deposition of particulate matter in the particulate filter to operate the engine always with proper EGR rates. Occurrence of excessive in internal exhaust gas recirculation caused by deposition of particulate matter in the particulate filter can be prevented, and increase in thermal load in the engine due to excessive increase in exhaust temperature and decrease in NOx reduction effect caused by excessive exhaust gas recirculation can be prevented.

The invention claimed is:
1. An engine comprising:
a variable geometry (VG) turbocharger;
a particulate filter located downstream of the variable geometry turbocharger;
a cylinder having an exhaust passage with at least one exhaust valve;
an EGR (exhaust gas recirculation) system constructed such that exhaust valve sub-lift EGR is performed by allowing the at least one exhaust valve to lift during an intake stroke so as to allow a fraction of exhaust gas in the exhaust passage of the cylinder to flow back into the cylinder;
a means for detecting DPF (diesel particulate filter) pressure differences which are exhaust gas pressure differences in the particulate filter; and
an internal EGR controller having:
a VG nozzle angle setting section in which a VG nozzle angle corresponding to engine operation conditions represented by rotation speed and engine load is established;
a DPF (diesel particulate filter) reference pressure difference/EGR rate setting section in which DPF reference pressures that are maximum DPF pressure differences commensurate with an EGR rate of the exhaust valve sub-lift EGR with which predetermined reduction in $NO_x$ emission is obtained under a permissible limit of exhaust temperature are established; and
a DPF pressure difference/VG nozzle angle setting section in which a relation between the DPF pressure differences and associated VG nozzle angles of the variable geometry turbocharger is established,
wherein the internal EGR controller calculates deviation of the detected DPF pressure difference in comparison with the DPF reference pressure, calculates a VG nozzle angle adjustment amount corresponding to the calculated deviation based on the DPF pressure difference/VG nozzle angle setting section, corrects the VG nozzle angle that corresponds to the engine operation conditions and is calculated in the VG nozzle angle setting section using the calculated VG nozzle angle adjustment amount so as to calculate a corrected value of the VG nozzle angle, and controls an actuator to set the VG nozzle angle at the corrected value.

2. The engine according to claim 1, further comprising:
a variable capacity compressor capable of being changed in discharge pressure to supply pressurized air to the engine, wherein
the internal EGR controller controls the variable capacity compressor so that air supply pressure to the engine is increased by the variable capacity compressor when the corrected VG nozzle angle is larger than the VG nozzle angle that corresponds to the engine operation conditions and is calculated in the VG nozzle angle setting section.

3. The engine according to claim 1,
wherein the variable geometry turbocharger includes a compressor, the engine further comprising:
a variable capacity compressor connected in series with the compressor of the variable geometry turbocharger so that air pressurized by the variable capacity compressor is further compressed by the compressor of the variable geometry turbocharger.

* * * * *